United States Patent [19]
Ernst, Jr. et al.

[11] 3,938,662
[45] Feb. 17, 1976

[54] SELECTIVE IMPRINTING MACHINE

[76] Inventors: Franklin Henry Ernst, Jr., 2500 Emerson St., Napa, Calif. 94558; Dalny Travaglio, 299 Lexington Road, Kensington, Calif. 94707

[22] Filed: Dec. 3, 1973

[21] Appl. No.: 421,417

Related U.S. Application Data

[60] Division of Ser. No. 364,010, May 25, 1973, Pat. No. 3,817,171, which is a continuation of Ser. No. 99,346, Dec. 18, 1970, abandoned.

[52] U.S. Cl. .......... 209/73; 209/74 R; 209/111.7 R; 250/569; 356/168; 235/61.7 R
[51] Int. Cl.² ..................................... G06K 19/06
[58] Field of Search ......... 209/73, 74, 111.7, 111.6, 209/111.5, 110; 250/569, 555; 356/165, 166, 167, 168; 235/61.7 R; 35/48 R, 48 B

[56] References Cited
UNITED STATES PATENTS

| | | | |
|---|---|---|---|
| 2,720,360 | 10/1955 | Luhn | 209/111.7 X |
| 2,898,801 | 8/1959 | Rockafellow | 209/111.7 X |
| 3,329,424 | 7/1967 | Rabek | 209/74 R X |

FOREIGN PATENTS OR APPLICATIONS

| | | | |
|---|---|---|---|
| 89,154 | 4/1957 | Norway | 356/168 |

*Primary Examiner*—Robert B. Reeves
*Assistant Examiner*—Joseph J. Rolla
*Attorney, Agent, or Firm*—Murray K. Hatch

[57] ABSTRACT

A selective imprinting machine of the type used for addressing mailed material, utilizing embossed card-sized media of the "credit-card" type having a matrix of perforations sensed for comparison against the master. The master is another perforated card with the perforations on both cards photoelectrically sensed. In one embodiment the cards move along a linear path, and in another they are carried on a rotating drum which also bears the master card. The media are placed on the drum by a rocker arm actuated by a cam driven by the drum, scanned simultaneously with the master for comparison and ejected tangentially from the drum to a receiver. A print signal is produced until inhibited by mismatch between the master and the individual embossed media. The elected media are imprinted against a receiving medium such as an envelope by a print roller, at the periphery of the drum, urged toward the periphery by a cam driven by the drum. The follower linkage for that cam has a movable link moved by an actuator in response to the absence of the print signal to disable the follower linkage. The cards are sensed by phototransistors, and the comparison between the individual card and the master is made by logic circuitry. The master has two hole locations for each hole location on the individual card, one hole location specifying presence of a hole on the individual card, and the other specifying absence of a hole on the individual card. A form is also shown having two receivers for the individual cards and a diverter operated in response to the logic circuitry to divert cards from the first receiver to the second.

8 Claims, 20 Drawing Figures

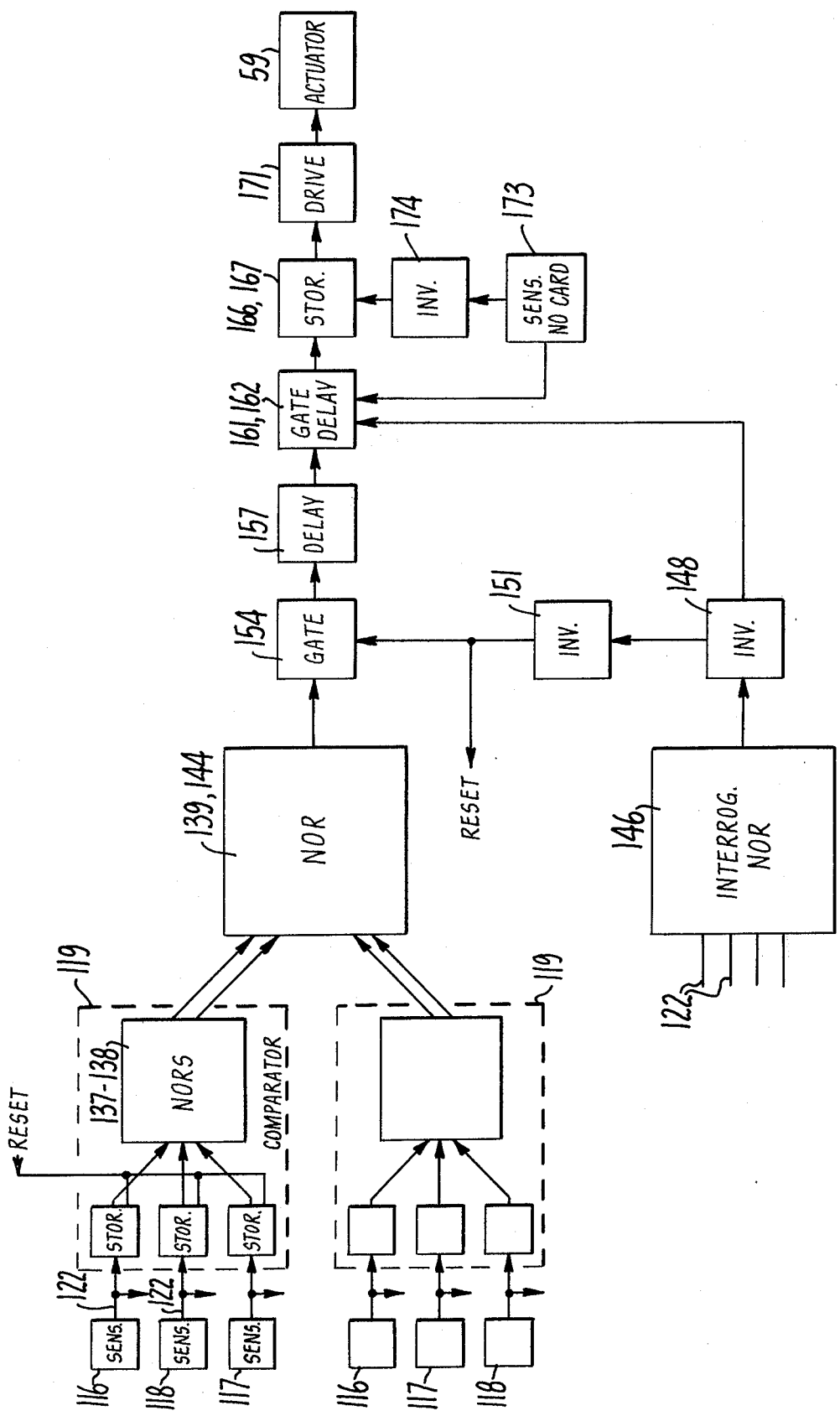

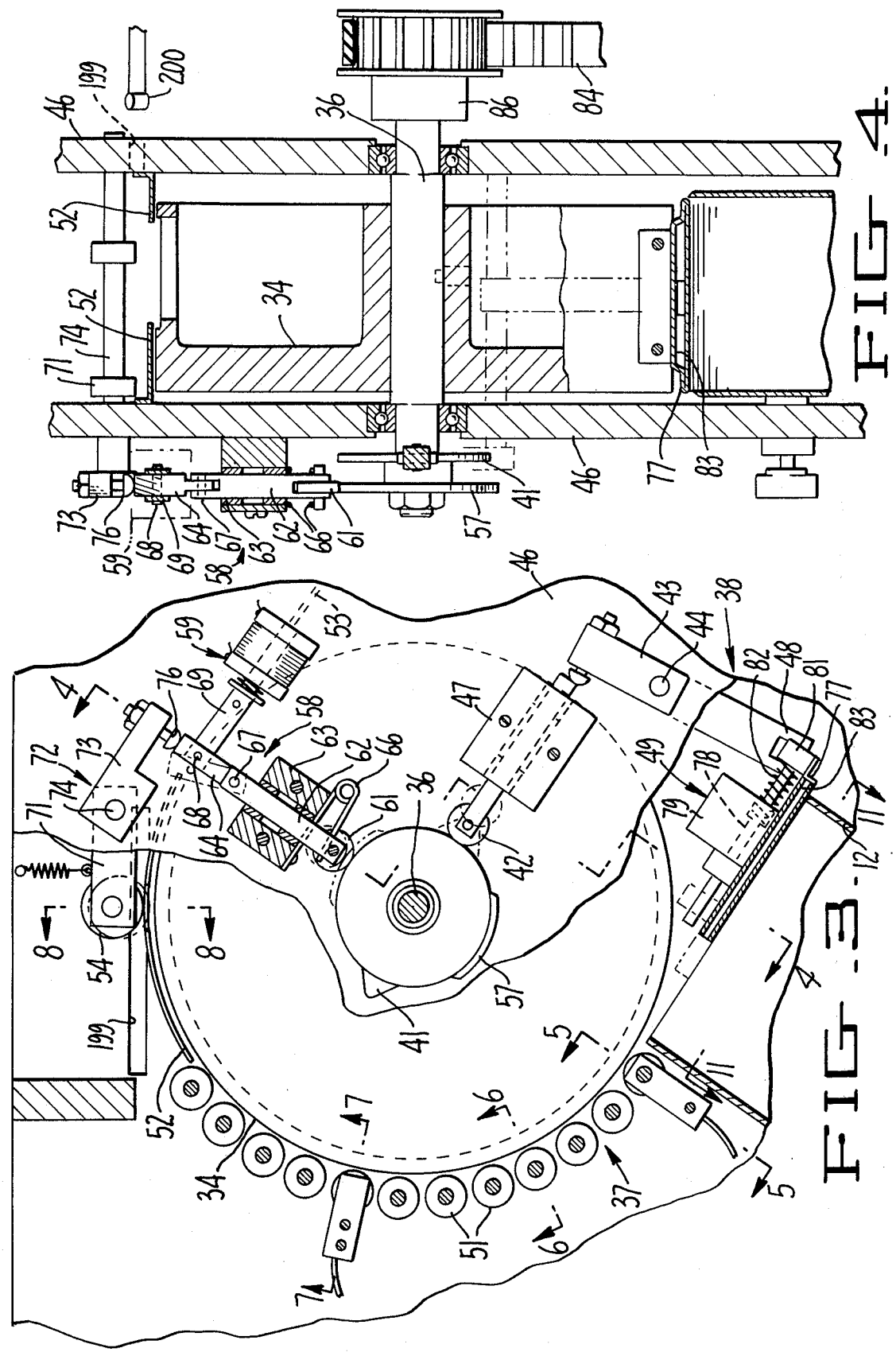

SELECTIVE IMPRINTING MACHINE

This is a division of application Ser. No. 364,010 filed May 25, 1973 now U.S. Pat. No. 3,817,171, which is a continuation of Ser. No. 99,346 filed Dec. 18, 1970, now abandoned

BACKGROUND OF THE INVENTION

This invention relates to a SELECTIVE IMPRINTING MACHINE, and more particularly to a machine of the type commonly used for addressing mailed material.

Machines of this type generally have a stock of embossed printing media such as cards or plates, and the plates are fed one at a time through the machine. Those plates bearing desired information are impressed by the machine against a receiving medium such as an envelope and are passed on through the machine to a receiver. Unwanted plates are detected by some sensing mechanism, and are passed straight through the machine without being impressed.

Prior machines of this type have either lacked the level of sophistication desirable in selecting desired plates from unwanted plates, or have achieved an enhanced level of sophistication by mechanical complexity, with attendant high manufacturing cost. Attempts to raise the level of versatility of such machines by providing additional electrical circuitry have generally resulted in requiring a large memory capacity or in awkward procedures for changing the selection routine of the machine, or both.

Prior art machines dependent upon mechanical identification of desired plates also suffered from the slowness inherent in such mechanical means as compared to electronic selection. A further problem of complexity of apparatus arose in those machines capable of sorting operations in combination with printing operations.

SUMMARY

The apparatus of the present invention encodes a large body of information of each individual card for use in selection of the card for imprinting. A highly discriminating selection of the cards to be imprinted may thus be made by the machine. The encoded information is photoelectrically sensed and electronically processed for the maximum speed and mechanical simplicity. The processing is arranged so that no extensive memory facility is required for analysis of the encoded information. Change in the selection procedure and criteria is easily made, as that procedure and criteria are governed by a master card also bearing perforations, which may readily be removed and replaced by another master card.

Using electronic processing of the sensed encoded data permits a high speed of operation not feasible with mechanical sensing, and the availability of electronic logic components allows a higher level of comparison to be made based on the encoded data. The mechanical simplicity achieved in the present invention permits the sorting function to be combined into the machine without difficulty.

Accordingly, it is a principal object of the present invention to provide a machine of the character described which is capable of a highly sophisticated selection of the plates for imprinting or sorting without sacrifice of the mechanical simplicity of the machine.

It is a further principal object of the present invention to provide a machine of the character described which exercises a rapid and reliable discrimination between desired and unwanted printing plates.

Another object of the present invention is to provide a machine of the character described which is capable of sorting out desired printing plates from those passing through the machine and physically segregating desired plates from unwanted plates.

A further object of the present invention is to provide a machine of the character described which simultaneously compares individual plates with the master card in a line-by-line fashion.

A still further object of the present invention is to provide a machine of the character described having a readily interchangeable master for determining the selection criteria.

Yet another object of the present invention is to provide a machine of the character described which does not require extensive memory capacity.

Further objects and advantages of the invention will become apparent as the specification progresses, and the new and useful features of the selective imprinting machine will be more fully defined in the claims.

BRIEF DESCRIPTION OF THE DRAWINGS

The preferred form of the present invention is illustrated in the accompanying drawings, forming part of the specification, in which:

FIG. 2 is a schematic and block diagram of the operation of the selective imprinting machine of the present invention.

FIG. 3 is a partial front elevation, on an enlarged scale, of the machine of the present invention, with parts shown broken away and parts shown in cross section.

FIG. 4 is a cross-sectional view taken substantially along the plane of lines 4—4 of FIG. 3.

Figure 1:
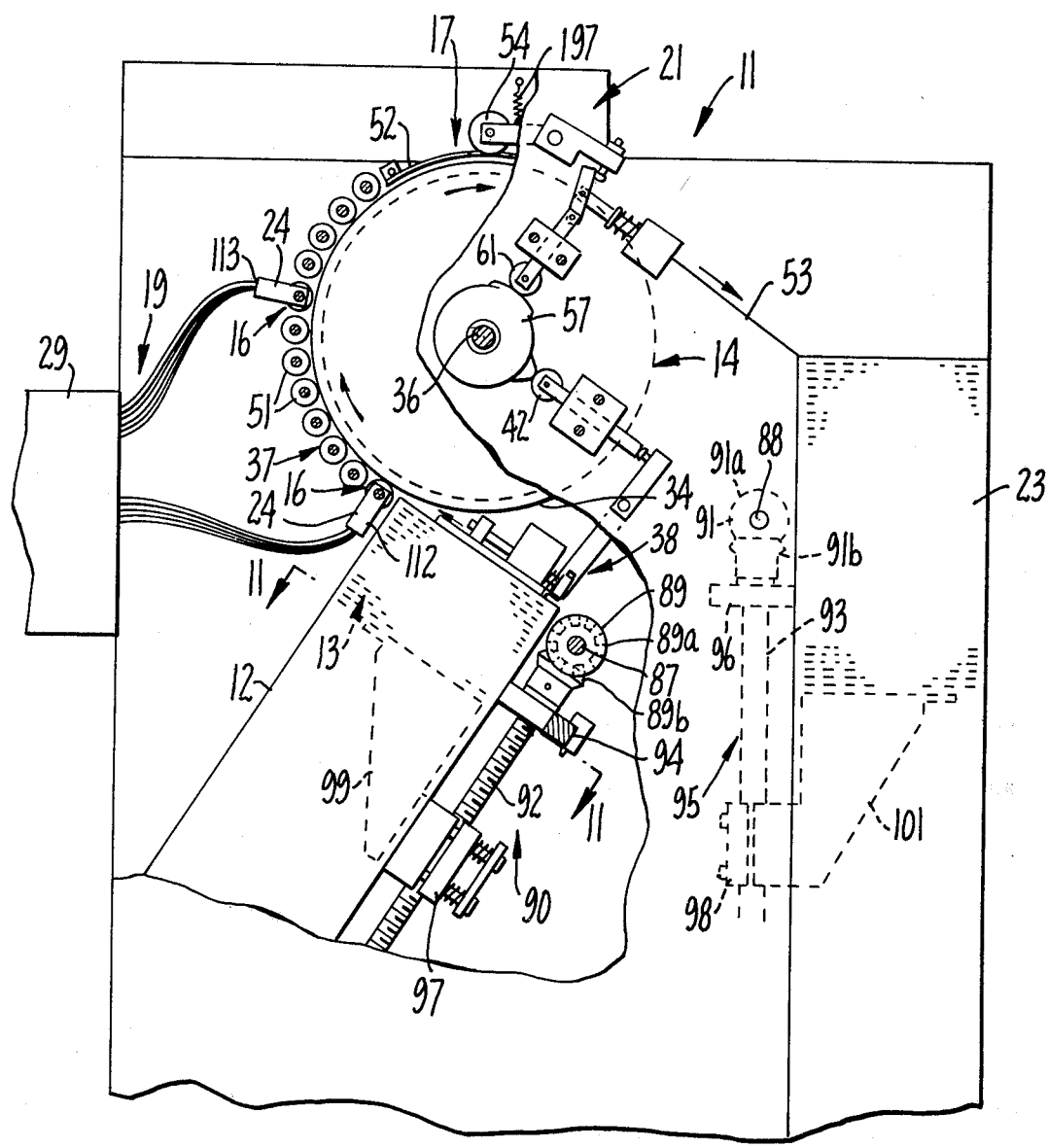
FIG. 1 is a partial front elevation view of a selective imprinting machine constructed in accordance with the present invention, with parts thereof shown broken away for clarity.

While only the preferred forms of the present invention are shown here, it should be understood that various changes or modifications may be made within the scope of the claims attached hereto without departing from the spirit of the invention.

DESCRIPTION OF THE PREFERRED EMBODIMENTS:

Referring to the drawings in detail, it will be seen that the selective imprinting device 11 of the present invention imprints from a plurality of individual units of information-bearing media 13, and includes a master medium 18 encoded with data specifying the individual units 13 of information-bearing media to be selected for imprinting, a scanning means 19 for scanning one of the individual units 13 and the master medium 18 to compare their characteristics and issuing a print signal upon correspondence of the characteristics, and an imprinting means 21 responsive to the print signal from the scanning means 19 to cause the individual unit 13 to be imprinted against a receiving medium such as an envelope 22.

The selective imprinting device 11 also includes a transport means 14 which effects relative movement between the individual unit 13 and the master medium 18 on the one hand and the scanning means 19 on the other hand. The movements of the individual unit 13 and the master medium 18 are essentially continuously synchronized with each other so that they are jointly and simultaneously scanned by the scanning means 19. The scanning and imprinting means 19 and 21, respectively, are here shown as occupying the fixed locations generally indicated as scanninig stations 16 and imprinting station 17, with the individual and master media moving, but it should be appreciated that the fixed and moving elements could be interchanged. The arrangement shown is preferred for reasons of mechanical simplicity and reliability.

The transport means 14 receives the individual media 13 from a magazine means generally indicated at 12, which holds a supply of the media 13. The transport means 14 carries the individual medium 13 past the scanning and imprinting stations 16 and 17 and ultimately to a receiver 23, into which the individual medium 13 is discharged.

The scanning means 19 includes electronic circuitry generally indicated in FIG. 2 at the numeral 26, responsive to the signals resulting from the scanning of the individual unit 13 and the master medium 18. The electronic circuitry 26 issues a print signal until inhibited by a mismatch between the characteristics of the individual unit 13 and the master medium 18 being scanned. Upon such a mismatch the print signal terminates. Detectors 24 in the scanning means 19 are located adjacent the scanning stations 16 and in the present embodiment are photoelectric sensors, and the information is encoded into the individual units 13 and the master medium 18 by perforations 27 as shown in FIGS. 9 and 10.

The individual unit 13 and the master medium 18 are illuminated as they pass the scanning stations 16 by light sources 28, shown here as small incandescent lamps. The individual units 13 and the master medium 18 pass between the light sources 28 and the detectors 24 so that the detectors 24 are affected by the presence or absence of a perforation at a given location on either medium.

Figure 5:
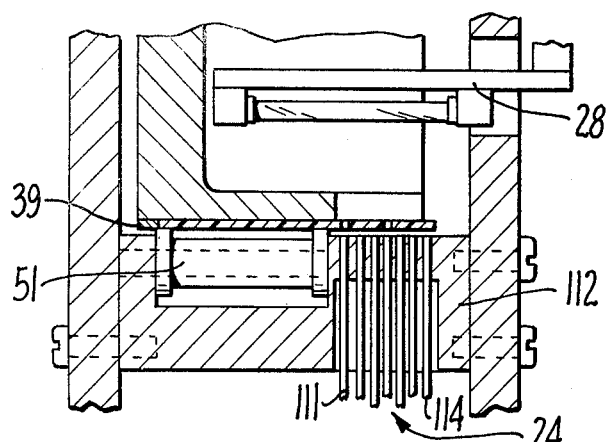
FIG. 5 is a cross-sectional view on an enlarged scale taken substantially along the plane of lines 5—5 of FIG. 3.
Figure 7:
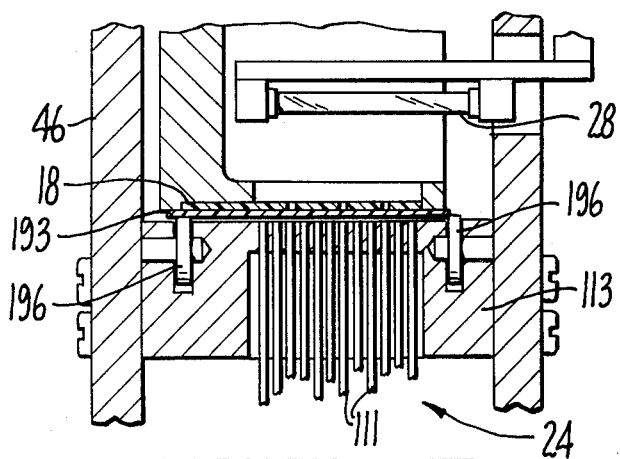
FIG. 7 is a cross-sectional view on an enlarged scale taken approximately along the plane of lines 7—7 of FIG. 3.

In the embodiment illustrated in FIGS. 5 and 7, the detector units 24 include individual fiber optic units, each fiber optic light conduit being located in a position to scan one of the columns of perforations 27 as it moves past. With the fiber optic form shown in these figures, the fiber optic units are bundled together in a fashion similar to an electrical cable and led to the housing 29 which encloses the electronic circuitry 26. Within the housing 29 the electronic circuitry is coupled to the fiber optics through phototransistors associated with each light conduit of the fiber optics. In another form of the detector units 24, shown in FIG. 13, a strip of phototransistors spaced an appropriate distance apart is incorporated into the detector units 24 immediately adjacent the surface of the individual information-bearing unit 13. In this form, the electrical impulses are conducted back to the electronic circuitry 26 in the housing 29 by conventional electrical cabling.

Figure 9:
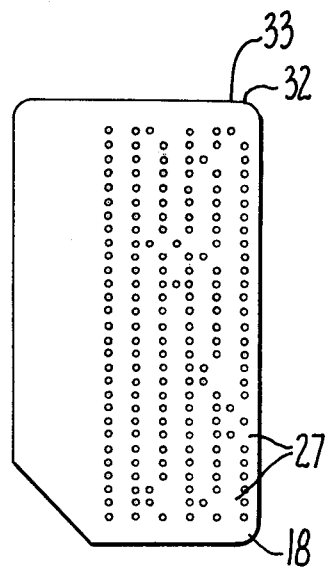
FIG. 9 is a plan view of the master indicia card used with the present invention.
Figure 10:
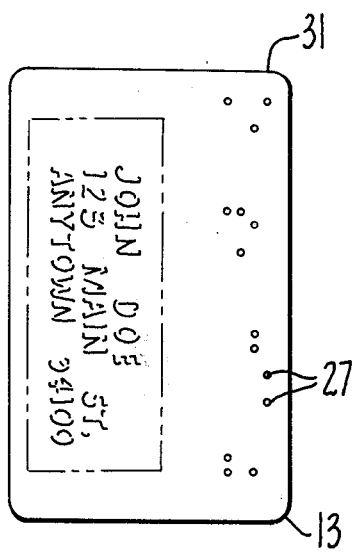
FIG. 10 is a plan view of a typical individual imprinting card used with the present invention.

As may be seen in FIGS. 9 and 10, both the individual unit 13 and the master card 18 are formed with a pattern of perforate and imperforate areas laid out in a grid shape in a location so as to be in register with the detector units 24 shown in FIGS. 5 and 7. As shown here, the grid on the individual unit 13 is six vertical columns wide by thirty horizontal rows in length, and the master card 18 is correspondingly twelve columns wide and the same length.

Only a portion of the perforable areas represented by each location in each of the grids is usually perforate. The perforations 27 pass light from the lamp 28 to detectors 24 and the imperforate areas block that light transmission. There are two vertical columns of potentially perforable locations on the master card 18 corresponding to each one vertical column on the individual unit 13. Taking as an example the column 31 nearest the right-hand edge of the individual unit 13, there is a corresponding column 32 on the master card 18 representing absence of a hole in column 31 on the individual unit 13 and a column 33 representing presence of a hole at the corresponding horizontal location of column 31 on the individual unit 13. Thus it may be seen that each location in the column 31 on the individual unit 13 corresponds to a pair of potential hole locations, one lying in column 32 and one lying in column 33 on the master card 18.

Of the two locations on the master card 18 corresponding to one location on the individual unit 13, only one of the two locations will generally bear a hole on the master card. Thus for correspondence of the individual unit 13 with the master card 18, for every point at which a hole has been punched in a hole column such as column 33 of the master card 18, a hole should be found at the corresponding location on the individual unit 13, and for every location at which a hole is punched in the no-hole column, such as column 32 of the master card 18, no corresponding perforation should be found at the corresponding location on the individual unit 13. In this fashion, the presence or absence of a perforation at a particular location on the individual unit 13 is positively specified by the location of a perforation at one of two corresponding positions on the master medium 18.

This positive specification of the presence or absence of a hole at a given location on the individual unit 13 by the pair of potential locations on the master card 18 imparts a substantially increased degree of reliability to the operation of the imprinting machine and also serves to automatically detect any accidental mispunching of the master medium 18. While the perforations have been shown here occupying a matrix of six- and twelve-column widths by thirty-row length, it should be appreciated that other numbers of rows and columns could also be successfully used, with two columns on the master unit corresponding to one column on the individual unit.

The transport means 14 of the embodiment shown in FIGS. 1 through 8 includes a drum 34 mounted for rotation about its axis on an axle 36, a guide means generally indicated at 37 surrounding a portion of the circumference of the drum 34, and an injector means 38 for removing individual information-bearing media 13 one at a time from the magazine 12 and placing the media 13 one at a time onto the periphery of the drum 34 at a fixed location along that periphery. Since the master card 18 is already on the periphery of the drum 34, the rotation of the drum carries the master 18 and the individual unit 13 past the scanning stations 16 in synchronism.

Figure 12:
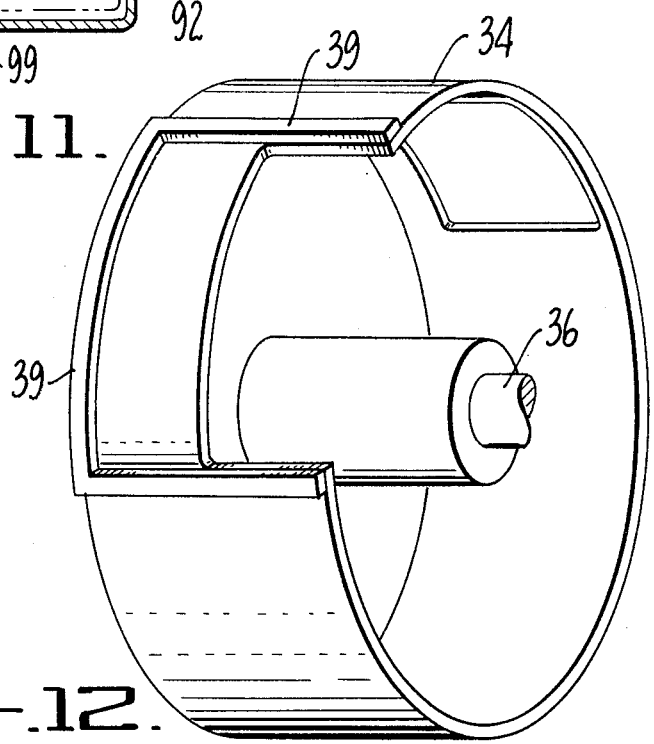
FIG. 12 is an oblique view of the drum, showing the stop means.

The guide means 37 serves to keep the individual information-bearing medium 13 curved to the approximate curvature of the circumference of the periphery of the drum 34, assuring that the individual unit 13 remains in the proper fixed location on the drum 34 and moves along with the rotation of the drum. The drum 34 is equipped with a stop means 39 which prevents the individual medium 13 from axial and circumferential movement on the drum 34. It may be seen in FIG. 12 that the stop means 39 consists of a metal strip forming three sides of a rectangle, mounted on the surface of the periphery of the drum 34 in surrounding relation to the individual medium 13.

The injector means 38 includes a cam 41 mounted on the shaft 36, a follower 42 which rides on the cam 41, and a rocker arm 43 which is pivotally mounted by a pivot pin 44 on the sidewall 46 of the machine 11. The follower 42 is journaled for sliding motion through a journal block 47, also mounted on the sidewall 46. The end 48 of the rocker arm 43 opposite the follower 42 engages a pick-off mechanism 49 located at the top of the magazine 12. Each reciprocation of the rocker arm 43 causes the pick-off mechanism 49 to move the topmost individual information-bearing medium 13 to the left, or clockwise, as shown in FIG. 3, into engagement with the drum 34. The rotation of the drum 34 will cause the individual unit 13 to be pinched between the drum 34 and the guide means 37, so that the individual unit 13 will be carried along by the motion of the drum 34.

Since the pick-off of the topmost individual unit 13 from the magazine 12 is actuated by the cam 41 on the same shaft as the drum 34, it can be seen that the individual unit 13 will be picked off and moved into contact with the drum always at precisely the same rotational position of the drum 34. That rotational position is selected to be the one in which the stop means 39 are correctly aligned to receive and retain the individual unit 13. The throw, or linear motion, produced by the pick-off mechanism 49 may be carefully adjusted to place the individual unit 13 firmly against the stop means 39, so that accurate registry of the position of the individual unit 13 of the drum 34 is assured.

The guide means 37 includes a plurality of rollers 51 which surround a portion of the drum 34 and a slide plate, or shoe 52, which surrounds an additional portion of the circumference of the drum 34, in the vicinity of the imprinting station 17. The guide plate 52 terminates at a circumferential point in the vicinity of the imprinting means 21, so that after the individual medium 13 has passed the imprinting station 17 it is released from the pressure of the guide means 37 which caused it to conform to the circumference of the drum 34. Since the individual unit 13 is made of fairly stiff plastic material having a resilient tendency to return to its original flat state, the individual unit will spring free of the drum 34 and the stop means 39 and will exit tangentially from contact with the drum 34 along a slide plate 53 to the top of the receiver 23. As the drum 34 continues its rotation, the portion of its periphery having the stop means 39 will revolve around agaon to the vicinity of the pick-off mechanism 49 and will receive from the pick-off mechanism 49 another one of the individual media 13.

The imprinting means 21 includes a print roller 54 located next to the periphery of the drum 34 and movable toward and away from the periphery of the drum 34. As may be seen in FIG. 10, the individual units of information-bearing media 13 have embossed, or raised, characters 56 on a portion of their surface, after the well known fashion of plastic printed cards and charge plates. The pressure of the print roller 54, when it is moved to its position toward the periphery of the drum 34, bears against the embossed characters 56 on the individual medium 13 to transfer the outlines of those characters to the envelope 22 adjacent the imprinting station 17.

The waiting envelope 22 is pinched down against the surface of the individual information-bearing unit 13 by the print roller 54, and, as the drum revolves carrying the individual unit 13 with it, the envelope is dragged along in registry with the embossed characters 56. Suitable inking means (not shown) may be provided to ink the surface of the print roller 64 so that areas of the envelope 22, uplifted by the embossing 56, will pick up ink from the print roller 54. Alternatively, the print roller may be made of a porous material and contain the ink supply within, in the fashion of self-inking rollers well known in the art, or the roller 64 may press a cloth or carbon ribbon against the envelope.

The imprinting means 21 also includes a cam means 57, driven in synchronism with the drum 34 by being attached to the common shaft 36, and a follower linkage 58 which follows the cam means 57 and transmits its motion selectively to the print roller 54. A portion of the follower linkage 58 is connected to an actuator 59 which is capable of moving the linkage 58 into and out of connection with the print roller 54. The follower linkage 58 includes a roller 61 which rides on the cam means 57, and a shaft member 62 journaled for reciprocating motion through a journal block 63, and bearing the roller 61 on one end. A spring 66 is mounted on the journal block 63 and biases the roller 61 toward the cam means 57. A link member 64 is pivotally mounted to the opposite end of the shaft 62 by a pivot pin indicated at 67. The pivoting link 64 is also pivotally attached by a pin 68 to the actuator arm 69 of the actuator 59. As here shown, the actuator 59 is a solenoid electrically actuated in response to the print signal, but it should be appreciated that other forms of mechanical, hydraulic and pneumatic actuators could likewise be used in this application. Upon actuation, the solenoid or actuator 59 draws the armature, or actuator arm 69, in toward the body of the solenoid 59, moving the pivoted link 64 to the position shown in solid lines in FIG. 3. The position shown in phantom is that which is occupied by the pivoted link 64 when the solenoid 59 is not actuated.

The print roller 54 is borne on one arm 71 of a rocker mechanism 72. The rocker mechanism 72 is mounted on the chassis of the machine 11 for pivotal motion about an axle 74, and has a second arm 73 which is engageable by the pivoted link 64. It may be seen that when the solenoid 59 is actuated and the movable link 64 is in the position shown in solid lines in FIG. 3, the motion of the roller 61 caused by the cam means 57 will be transmitted through the link 64 to the arm 73 of the rocker mechanism 72. The rocker mechanism will then pivot in a counterclockwise direction, as seen in FIG. 3, to drive the print roller 54 toward the periphery of the drum 34. The waiting envelope 22 is thus impressed against the individual unit 13 as the individual unit rolls by the drum 34.

If no print signal is present, the solenoid 59 is not actuated and the pivoted link 64 is in the position shown in phantom in FIG. 3. In this position the reciprocating motion of the shaft 62 caused by the movement of the roller 61 on the cam 57 is not transmitted through the pivoted link 64 to the arm 73, as the arm 64 has been moved out of alignment with the button 76 on the end of the arm 73.

The pick-off mechanism 49 of the injector means 38 includes a sliding cassette or tray member 77, which slides across the top of the magazine 12, and a guide member 78 journaled through a journal block 79. The cassette 77 and the guide member 76 are both attached to a block member 81 which is captured between the arms of a yoke formed at the lower end 48 of the rocker arm 43. A spring 82 is interposed between the journal block 79 and the block member 81 along the guide rod 78, so as to bias the cassette member 77 toward its retracted position and urge the follower 42 toward the cam 41.

The individual units, or cards, 13 are advanced upward in the magazine 12 by a follower mechanism described below. As the cards advance, the topmost card 13 slips into the recess 83 in the cassette 77. As may be seen in FIG. 3, the cassette does not extend the length of the longest dimension of the individual card 13, so that the leading, or left-hand edge as seen in FIG. 3, of the card 13 is free to be pinched between the first of the guide rollers 51 and the drum 34. The cassette 77 essentially consists of a shallow box having three sides and a top but no bottom, being open on the side facing downward in FIG. 3. It is closed on both of the sides paralleling the long dimension of the card 13 and on the right-hand side as seen in FIG. 3. Thus the individual card 13 is free to slip out of the cassette 77 and be pulled away from the cassette by the action of the rotation of the drum 34 and the retraction of the cassette 77 back to its card-receiving position shown in FIG. 3.

The followers in the magazine 12 and receiver 23 are essentially advancing and retracting mechanisms, respectively, driven in synchronism with the drum 34 by a timing belt 84 of which a portion is shown in FIG. 4, to advance and retract the stacks of individual media 13. The follower in the magazine 12 advances the stack toward the injector means 38, while the follower in the receiver 23 retracts the stack in the receiver away from the end of the slide plate 53. The belt 84 is driven by an appropriate motor (not shown) and engages a sprocket 86 mounted on the shaft 36 for turning the drum 34 and also engages sprockets (not shown) on the shafts 87 and 88, respectively, which drive the follower in the magazine 12 and the receiver 23.

The followers are generally indicated at 90 and 95 and include shafts 87 and 88, each bearing one member of bevel gear pairs 89 and 91, respectively, the other gear in each of the pairs being fixed to one of lead screws 92 and 93, respectively. The lead screws 92 and 93 are journaled in mounting blocks 94 and 96, respectively, for freedom of rotation about the axis of the screws 92 and 93. Split-nut mechanism 97 and 98, respectively, are engaged with the shafts 92 and 93 and fastened to follower blocks 99 and 101, respectively, disposable within the supply magazine 12 and the receiver magazine 23.

It will be noted that since the gear 89a attached to the shaft 87 lies on the side of the pair toward the viewer, with the shaft 87 crossing over the other gear 89b, clockwise motion of the shaft 87 and the gear 89a as seen in FIG. 1, will produce a motion of shaft 92 which causes the split-nut assembly 97 to advance upwardly along the screw 92. This motion advances the stack of individual media units 13 within the magazine 12 toward the pick-off mechanism 49 at the top of the magazine 12. Gear 91a lies on the side of the pair away from the viewer, so that clockwise motion of the shaft 88 produces motion of the lead screw 93 and the follower block 101 opposite to screw 92 and follower 99. The stack of media 13 in the receiver thus drops downwardly as the receiver 23 fills.

Figure 11:
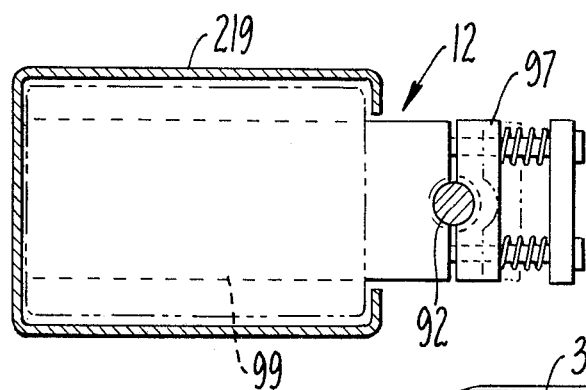
FIG. 11 is a cross-sectional view on an enlarged scale taken approximately along the plane of lines 11—11 of FIG. 1.

The magazine 12 and the receiver 23 are held in place within the machine 11 by suitable retaining means (not shown) To remove the magazine 12 or the receiver 23, the follower block 99 or 101, respectively, may be moved out of the magazine or receiver by releasing the split-nut mechanism 97 or 98 and moving the associated follower block 99 or 101 away from the stack of cards 13. As shown in FIG. 11, the cross sections of the magazine 12 and the receiver 23 are generally in the form of a rectangular C-shape so that they constitute essentially tubes having one partially open side allowing the follower block 99 or 101 to slip through, and allowing access for removal and insertion of cards 13.

The magazine 12 and the receiver 23 are essentially identical, and may be substituted for each other, so that the individual media 13 may be run through the machine 11 again. When the receiver 23 is removed from the machine 11 and placed in use as the supply magazine 12, it is inverted from the orientation in which it is shown in FIG. 1 so that the embossed areas of the individual media 13 are once again facing radially outward of the drum, and the media 13 are in the original sequence. While this substitution has been described in terms of the magazine 12 and receiver 23 illustrated in FIG. 1, it should be appreciated that in actual practice a machine 11 of this type would be equipped with a number of such interchangeable magazine and receiver units bearing different lists of data on the embossed individual media 13 or different portions of a large list. The split-nut assemblies 87 and 98 also allow the follower blocks 99 and 101 to be adjusted in longitudinal position along their respective lead screws 92 and 93 to accommodate magazines 12 and receivers 23 which are not completely filled with individual media 13.

Figure 13:
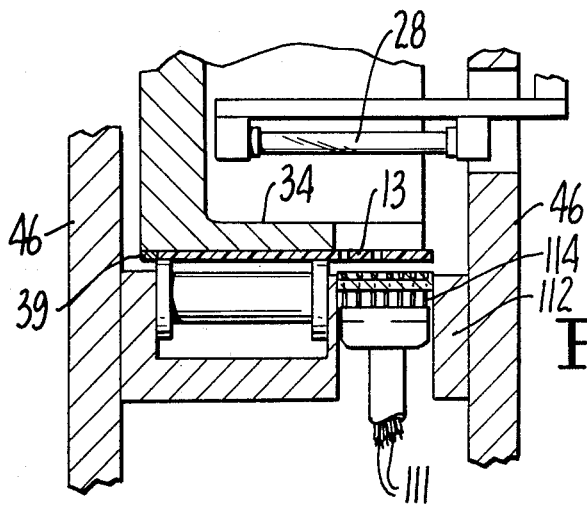
FIG. 13 is a cross-sectional view corresponding to FIG. 5, showing a modified form of detector block.

As mentioned above, the lines 111 leading from the detector units 24 in FIGS. 5 and 7 represent light-piping fibers of the fiber-optics type, bundled together to carry the individual beams of light back to phototransistors or photodiodes within the electronic circuitry package 26. Alternatively, as shown in FIG. 13, the lines 111 may be replaced by lead wires form a bank of photodiodes or phototransistors mounted in the face of the detector blocks 112 and 113 immediately adjacent the periphery of the drum 34. In either event, it will be noted that the block 112 containing the detectors 24 for the individual unit 13 has an extra detector line 114, making a total of seven detectors ganged at that location. The added detector scans an area of the individual card 13 immediately to the right of the farthest right columns of holes as viewed in FIG. 10, and serves to inform the logic circuitry in the electronic package 26 whether or not an individual card 13 is present on the drum for examination. The detector block 113 which serves to scan the master unit 18 is equipped with twelve detectors ganged in a line and their respective leads, electrical or fiber-optic, 111.

Figure 19:
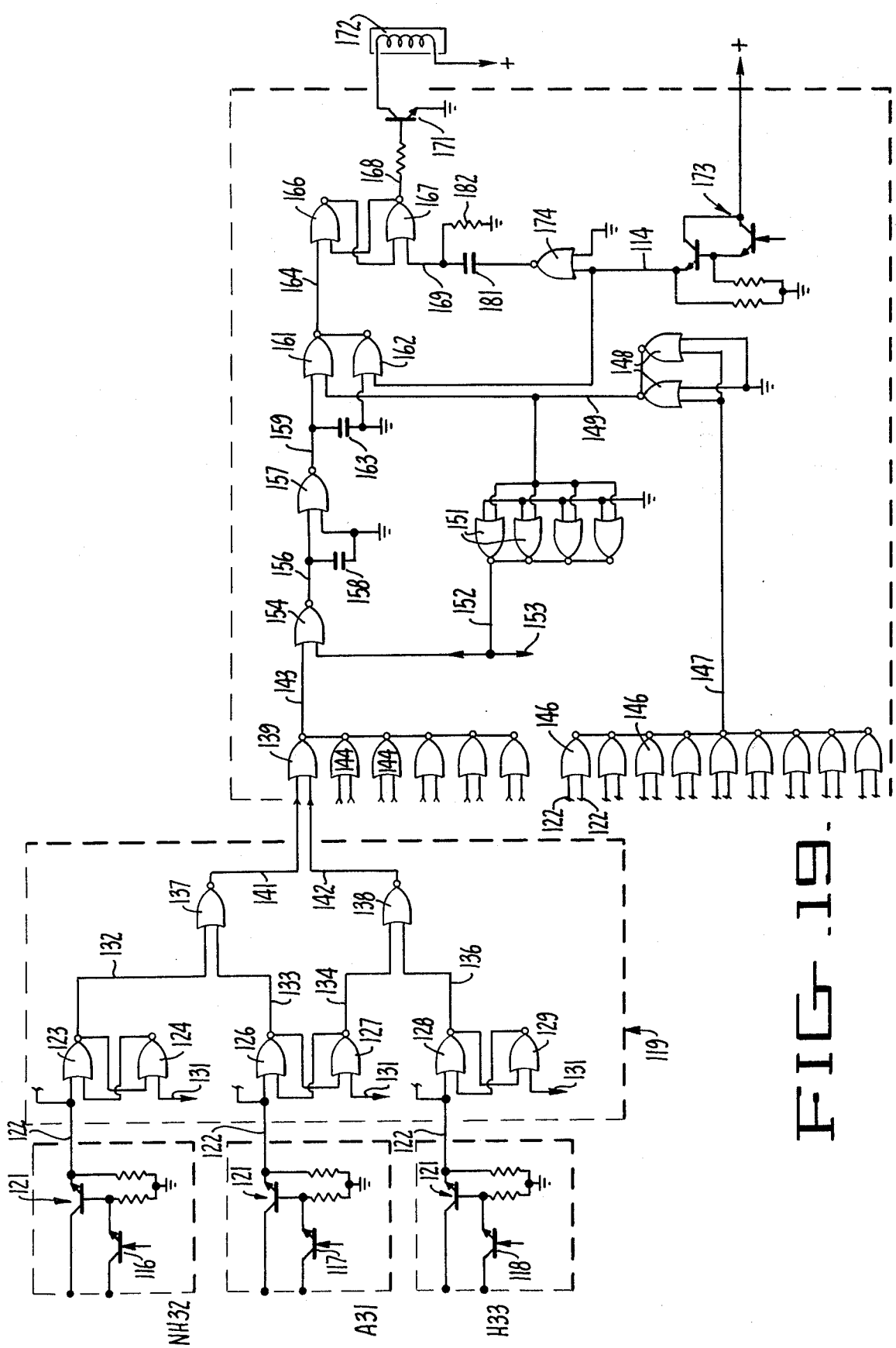
FIG. 19 is a schematic diagram of the electronic circuit of the scanning means.

Turning now to the schematic diagram of FIG. 19, whether the embodiment is one in which the phototransistors are actually located in the detector blocks 112 and 113 or one in which they are remotely located in the electronics package 26 and the light conducted to them by fiber-optic techniques, it will be noted that each of the six files or columns of hole locations on the individual unit 13 has three phototransistors or photodiodes associated with it, one being in the individual unit detector block 112 and two being in the master card detector block 113. The phototransistors or photodiodes associated with the master card detector block 113 are positioned to receive light from the files or columns of hole positions in the master unit 18 corresponding to the file on the individual unit 13.

As here shown, the detector units are phototransistors 116, 117, and 118. Phototransistor 117 is associated with the detector block 112 to receive light from the scanning of the right-hand column 31 of the individual unit 13. Phototransistor 116 is arranged to receive light from the scanning of the column 32 of the master unit 18, associated with the absence of holes in the individual medium 13, and the phototransistor 118 is positioned to receive light from the scanning of column 33 of the master unit 18, associated with the presence of a hole in column 31 of the individual unit 13. Phototransistor 117 may thus be though of as scanning column 31 of the individual unit 13 for the presence or absence of holes, and phototransistor 116 may be regarded as scanning column 32 of the master card for "no hole" signals. Phototransistor 118 would be similarly regarded as scanning column 33 of the master unit 18 for "hole" signals.

The triplet of transistors 116, 117 and 118 is associated with a comparator circuit 119. The comparator circuit 119 produces a first output signal upon light activation of phototransistor 118 simultaneously with light activation of phototransistor 117, and also produces that same output signal upon light activation of phototransistor 116 in the absence of light activation of phototransistor 117. A second output signal is produced by the comparator circuit 119 when phototransistors 116 and 117 are simultaneously illuminated and also when phototransistor 118 is illuminated and phototransistor 117 is not.

Thus, the first output signal from the comparator 119 signifies congruence between the conditions specified by columns 32 and 33 of the master unit 18 and the condition actually detected in the corresponding lineal position along column 31 in the individual unit 13. The second output signal, on the other hand, represents mismatch or noncongruence between the specified condition and the condition found. Although only one triplet of transistors 116, 117 and 118 is shown associated with one comparator circuit 119, it should be appreciated that there are as many triplets of phototransistors as there are columns on the individual unit 13, with one comparator circuit 119 serving each triplet. In the present embodiment there would thus be six triplets and six comparator circuits 119.

As here shown, and particularly where the phototransistors are located in the detector heads 112 and 113 and have an appreciable lead length back to the electronics package 26, each of the phototransistors 116, 117 and 118 is associated with an emitter follower amplifier 121 for amplifying the output of the phototransistor. The output of each of the emitter follower amplifiers 121 is communicated on a line 122 to the comparator circuit 119. Within the comparator circuit 119, each of the lines 122 is connected to the input of a cross-connected pair of logical NOR circuits 123 and 124, 126 and 127, and 128 and 129. Each of the cross-connected pairs of NOR circuits forms a latching or storage circuit which locks into one of its two stable states upon receipt of a positive input on line 122 due to light activation of the associated phototransistor 116, 117 or 118. Each of the latching circuits formed by the cross-connected pairs of NOR units is equipped with a second input line 131 for receipt of a positive signal effective to clear the latching circuit by returning it to the untriggered state.

The cross-connected pair of NOR units 123 and 124 has an output line 132 connected to the output of the NOR unit 123. The cross-connected pair 128 and 129 has an output line 136 connected to the output of logic unit 128. The outputs of logic units 126 and 127 are connected respectively to a pair of output lines 133 and 134. The output lines 132 and 133 are connected in turn to a logical NOR circuit 137, and the output lines 134 and 136 are connected to a logical NOR circuit 138. The outputs of the two NOR units 137 and 138 are connected to the input of a NOR unit 139 by output lines 141 and 142, respectively.

There are two conditions in which there is congruence between the master card 18 and the individual unit 13 and two conditions under which there is noncongruence. One congruence condition is that in which a hole appears in column 32, calling for the absence of a corresponding hole in the individual unit 13, while no hole appears at the corresponding location in column 33 and no hole appears at the corresponding location in column 31. In this circumstance only phototransistor 116 is activated, producing a positive input to the NOR unit 123. As phototransistors 117 and 118 are not activated, negative inputs are produced to logical NOR units 126 and 128.

Logical NOR circuits of the present type operate to invert any positive input signal, producing a positive output only on dual negative input and producing a negative output on all other input combinations, so a positive input signal on one of the lines 122 will result in a negative output signal on the associated output line 132, 133 or 136. A negative input on line 122 to one of the logical NOR units 123, 126 or 128 will produce a positive signal on the associated output line 132, 133 or 136 as a second negative input is supplied to the NOR unit 123, 126 or 128 from the other NOR unit 124, 127 or 129 of the pair.

The positive input to NOR 123 produces a negative output on line 132, while the negative inputs to NORs 126 and and 128 on lines 122, together with the negative inputs supplied from the outputs of NORs 127 and 129, produce positive outputs on lines 133 and 136 and a negative output on line 134. Thus NOR 137 receives a negative input from line 132 and a positive input from line 133, while NOR 138 receives a negative input from line 134 and a positive input from line 136. The outputs of both NOR 137 and NOR 138 are therefore negative on both lines 141 and 142, so that the inputs to NOR 139 on lines 141 and 142 are both negative. Under these conditions, the output of NOR 139 is a positive signal to line 143. A positive signal on line 143 indicates this congruence, and a negative signal on line 143 indicates noncongruence.

congruence also occurs when there is no perforation in column 32 and there is a perforation in column 33, together with a perforation at the corresponding location in column 31. This situation represents the instruction calling for the presence of a hole at that point on the individual media unit 13. This combination of conditions produces precisely the reverse configuration of signals on lines 132, 133, 134 and 136. Specifically, NOR unit 123 receives a negative input from its input line 122 and thus produces a positive output on line 132 to NOR unit 137. NOR unit 126 receives a positive input from its input line 122, as does NOR unit 128 from its input line 122. Thus negative signals are produced on lines 133 and 136 and a positive signal is produced on line 134 by NOR unit 127. As before, each of the NOR units 137 and 138 receives one positive input and one negative input, although the positions are reversed. Negative outputs are therefore produced on lines 141 and 142 to NOR unit 139 which in turn produces a positive output to line 143, signifying congruence.

One of the conditions of noncongruence or mismatch is that in which a hole in the individual unit 13 is called for by the presence of a hole in column 33 and the absence of a hole in column 32, but no corresponding hole is found at the corresponding position in column 31. Under these conditions there is a negative input on line 122 to logic unit 123, producing a positive output on line 132, and there is also a negative input to logic unit 126 from the photo-sensitive transistor 117 observing column 31 on the individual unit 13, so that the output of NOR unit 127, the other member of the pair, on line 134 will therefore be negative. There is a positive input to NOR unit 128 on line 122 from transistor 118, so the output on line 136 from NOR unit 128 is negative. NOR unit 137 thus receives positive inputs on both lines 132 and 133 and produces a negative output on line 141, while NOR unit 138 receives a negative signal on both of its inputs, and thus produces a positive output signal on line 142. The inputs to NOR unit 139 are thus one positive from NOR unit 138 and one negative from NOR unit 137. The output of NOR unit 139 on line 143 is therefore negative, signifying noncongruence.

The remaining noncongruence condition is that resulting from the presence of a perforation in column 32 and the absence of a perforation in column 33, thus calling for the absence of a perforation in column 31, while a perforation actually appears in column 31. In this situation the input to NOR unit 123 is positive, producing a negative output on line 132, and the input to NOR unit 126 is likewise positive producing another negative output on line 133. The output of NOR unit 127 on line 134 is correspondingly positive, while the negative input to NOR unit 128 produces a positive signal on line 136. NOR unit 137 thus receives two negative inputs and produces a positive output on line 141, while NOR unit 138 receives two positive inputs and thus produces a negative output on line 142. The inputs to NOR unit 139 are thus one positive on line 141 and one negative on line 142. The resultant output of NOR unit 139 on line 143 is negative, signifying noncongruence.

It should be noted that should neither column 32 nor 33 be perforated, a positive signal will be produced on line 143 signifying congruence, regardless of whether or not a perforation is present at the corresponding location in column 31 on the individual unit 13. This occurs because the inputs to both logical NOR units 123 and 128 will be negative so that the outputs of those logical NOR units on lines 132 and 136 will be positive. With one input positive, NOR units 137 and 138 will always produce negative outputs from lines 141 and 142, regardless of the signals produced on lines 133 and 134. The signals on lines 133 and 134 will always be one positive and one negative, so that one or the other of NOR units 137 and 138 will receive two positive inputs while the other NOR unit receives a positive input and a negative input. Since both of those input configurations produce a negative output from the NOR units 137 and 138 to NOR unit 139, leading to a positive output on line 143, the presence or absence of a perforation in column 31 leading to the presence or absence of a positive input to NOR unit 126 is immaterial. This feature of the circuit produces a useful result by allowing the user to instruct the machine to disregard a particular location in column 31 on the individual unit 13 by punching neither corresponding location in column 32 or column 33 on the master card 18.

The pairs of logical NOR units 123 and 124, 126 and 127, and 128 and 129 have a latching function provided by the second member of each pair. One input of the second member of each pair is connected to the reset line 131, and whenever the units are not being reset a negative signal is provided on line 131 to each second member of the pairs. Thus any positive input on a line 122 to one of the logical NOR units 123, 126, or 128 produces a negative output from that NOR unit, and that negative output is not only fed to the associated output line 132, 133, or 136, but is also fed back to the other input of the associated NOR unit 124, 127 or 129.

The supply of two negative inputs to the NOR unit 124, 127 or 129 produces a positive output from that NOR unit, which positive input is then fed back to an input of the first NOR unit 123, 126, or 128. Thus, even if the positive input on line 122 should be removed from the NOR units 123, 126, or 128, one positive input will be still supplied to those NOR units from the associated cross-connected NOR unit 124, 127, or 129. With one positive input, the NOR units 123, 126, or 128 will continue to produce a negative output on their respective output lines.

The cross connected pairs of NOR units are cleared by the provision at the appropriate time of a positive signal on the line 131 to all of the NOR units 124, 127, and 129. This positive input will assure a negative output from all of the NOR units 124, 127, and 129, regardless of the signal present at the other input of those NOR units. All of the NOR units 123, 126, and 128, will thus be supplied with one negative input from their associated NOR unit 124, 127, or 129, and if negative signals are present on all of the lines 122 at that time, all of the NOR units 123, 126, and 128 will be supplied with dual negative inputs causing positive outputs on their associated output lines 132, 133, and 136, representing return to the rest or initial state.

Five additional NOR units are connected in parallel with NOR unit 139 for receipt of signals from the five remaining triplets of phototransistors and the five remaining comparator circuits 119 (not shown). Since the NOR units are connected in parallel with NOR unit 139, all of the inputs to all six parallel NOR units must be negative in order to maintain the positive signal on line 143 signifying congruence between the individual unit 13 and the master card 18. Thus it may be seen that congruence is required between the master card 18 and the individual unit 13 over the entire extent of the transverse row of perforation locations examined at any one given time by the detector blocks 112 and 113.

Noncongruence at any point along the transverse extent of the row of perforations on the individual unit 13 and the row of perforations on the master card 16 will result in the presence of at least one positive signal being supplied on an input to one of the NOR units 139 and 144 connected in parallel. Any such positive input will remove the positive signal from line 143 and replace it with a negative signal signifying noncongruence.

An additional nine NOR units 146 are also connected in parallel, with each of their inputs connected to one of the input lines 122 from the emitter follower amplifiers 121 associated with the phototransistors. The 18 inputs are thus supplied from the six triplets, of which phototransistors 116, 117, and 118 form one triplet. The function of the parallel connect NOR units 146 is to assure that the reading of the cards for congruence takes place only when all perforations are centered over their respective detector units 24.

It will be noted that the necessary condition for a positive output from the parallel NORs 146 is that all eighteen inputs be simultaneously negative. This condition occurs when none of the detector units 24 receives light through a perforation, signifying that the transport means 14 has moved the individual unit 13 and the master card 18 ahead so that the previously read transverse rows of perforations and perforation locations as seen by the detector blocks 112 and 113 are no longer aligned properly with those blocks and the blocks are now reading the solid area of the card lying between adjacent transverse rows of perforation locations. When this condition occurs, the simultaneous negative inputs on all eighteen input lines of the NORs 146 cause the production of a positive output signal on the common output line 147 of this parallel group. It is this positive signal on line 147 which eventually becomes the reset signal supplied to lines 131 and the interrogate signal.

The signal on line 147 is supplied to a parallel connected pair of NOR units 148 which serve to invert it and to increase the signal level delivered to line 149, the interrogate line. The inversion of the signal from line 147 occurs because that signal is supplied to one input of each of the NOR units 148, while the other input of each of the NOR units 148 receives a steady negative signal from the ground. Thus a positive signal on line 147 yields a positive input to each of the NOR units 148, and with the other input negative, the outputs coupled together and connected to line 149 will be negative. If the signal on line 147 is negative, the NOR units 148 will receive all negative inputs and produce a positive output.

One branch of the interrogate line 149 is connected to an input of each of four parallel-connected NOR units 151. The NOR units 151 serves in a fashion similar to the NOR units 148 to again invert and increase the driving power of the signal supplied to the clear line 152, connected to the outputs of the NOR units 151. One branch of the clear line 152 communicates as schematically shown by the arrow 153 with each of the clear line inputs 131 on each of the three latching circuits in each of the comparator circuits 119.

The clear line 152 also communicates with one input of a NOR unit 154. The NOR 154 serves as a gate to effectively block transmission of the reject signal from line 143 to further parts of the circuit once the clear signal has been received from line 152. The blocking occurs because the positive signal to the NOR unit 154 from line 152 assures that the output of the NOR unit 154 on line 156 will be negative regardless of the input from line 143 to the NOR unit 154. The reject signal at this point is equivalent to a positive signal on line 156.

Line 156 communicates the signal to one input of a NOR unit 157. The NOR unit 157 serves an inversion and hold or delay function. This function is provided in the NOR unit 157 by grounding the other input of the NOR unit and connecting a capacitor 158 between the inputs. A positive reject signal on line 156 will change the capacitor 158 to cause the input signal served by line 156 to be held in a positive condition after the positive signal is removed from line 156. A negative signal, signifying acceptance of the card, on line 156 will not charge the capacitor 158 and thus will not be held.

The output of the NOR unit 157 is communicated on line 159 to one input of a NOR unit 161. A second NOR unit 162 has its output coupled in parallel with the NOR unit 161, and together the NOR units 161 and 162 form the interrogate-gate. A capacitor 163 between line 159 and ground provides a hold function for a positive signal on line 159. The function of the interrogate-gate is to assure that the card is checked for congruence only at the proper time, that is when the interrogate signal is received from line 147 through the NOR units 148 and line 149. As the NOR unit 157 inverts the signal, the reject signal at line 159 is a negative signal while the accept condition is a positive signal.

Since the reject signal on line 159 is negative and the NOR unit 161 operates to invert that signal, it may be seen that obtaining the positive reject signal on output line 164 requires both the negative reject signal input on line 159 to the NOR unit 161 and the presence of the negative interrogate signal on line 149 to the second input of the NOR unit 161. In effect then, a reject signal will be gated through the NOR unit 161 only when accompanied by the interrogate signal from line 149. The gating effect of the NOR unit 162 will be discussed below in connection with the card-detect input.

The signal on line 164 is communicated to an output latch circuit formed by a cross-connected pair of NOR units 166 and 167. The NOR units 166 and 167 function as a storage or memory circuit similar to the cross-connected pairs of NOR units 123 and 124, for example, contained in the comparator circuit 119. A positive signal on line 164 signifying a reject condition will trigger the output latch circuit to produce a positive signal on the output line 168 of the NOR unit 167. As explained above in connection with the comparator circuit 119, the cross connections between the NOR units 166 and 167 cause the circuits to be locked into the condition of a positive output on line 168 as soon as a positive input is received on line 164, despite subsequent receipt of any negative input on line 164.

The presence of a positive signal on line 168 causes the output transistor 171 to cease conduction, and thereby de-energizes the coil 172. The coil 172 may either be the solenoid coil of the actuator 59, or preferably the coil of a relay which in turn switches power to the solenoid coil of the actuator 59. The output latch circuit formed by NOR units 166 and 167 is reset only by the supplying of a positive pulse on input lines 169 to NOR unit 167, so it may be appreciated that noncongruence of any one transverse row of the individual card 13 with the master card 18 will set the output latch circuit into reject condition despite subsequent congruence by any transverse rows farther along the card.

As mentioned above, one of the lines 114 in the address or individual card detector block 112 connects to a phototransistor which detects the presence or absence of an individual card 13 on the drum 34. This photoresistor and its associated emitter-follower amplifier transistor and circuit are indicated at 173. The absence of a card 13 from the drum 34 allows light to pass from the lamp 28 to the photoresistor and amplifier circuit 173, producing a positive signal on the output line 114. The presence of a card 13 on the drum 34 cuts off conduction in the phototransistor circuit 173 so that a negative signal is present on line 114. The output line 114 communicates with one input of the NOR unit 162 in the interrogate-gate, so that the positive signal on line 114 when no card 13 is present on the drum 34 will be inverted by the NOR unit 162 to produce a negative output to line 164. This negative output from NOR unit 162 overrides any positive reject signal produced at the output of NOR unit 161, thus blocking the reject signal when no card is present on the drum 34. When a card is present on the drum 34, the negative signal on line 114 produces a positive output from NOR unit 162 which can be overridden by a negative accept signal output from NOR unit 161, or combined with a positive reject signal output of NOR unit 161. This circuit arrangement prevents the output latch circuit from being triggered into the reject mode when no card is present on the drum.

The output line 114 is also connected to a NOR unit 174, and the other input of the NOR unit 174 grounded so that it functions as an inverter. The arrival of a new card 13 on the drum 34 causes output line 114 to turn negative and a positive signal is thus produced at the output of the NOR unit 174. The positive-going output of the NOR unit 174 is passed as a pulse through a capacitor 181 to the reset line 169 of the NOR unit 167. Although the output of the NOR unit 17 is a steady positive signal in this situation only a positive pulse is produced on line 169 so that the output latch circuit is flipped to a reset condition but is not held in the reset condition, due to the dumping of charge through the resistor 182. The output latch circuit composed of NOR units 166 and 167 is thus reset to an accept mode each time the leading edge of the new card 13 passes the detect block 112.

It will be noted that the effect of the capacitors 158 and 163 is to hold the circuits in either the accept or reject mode according to the outputs of the comparator circuits 119 and the NOR units 139 and 144, despite the clearing of the comparator circuits 119 and the blocking of the gate performed by NOR unit 154 upon receipt of the clear signal from line 152. The interrogate signal from line 149 also operates to simultaneously unblock the gate formed by the NOR unit 161 and cause the passage and inversion of the signal present on its input line 159.

LINEAR EMBODIMENT

Figure 14:
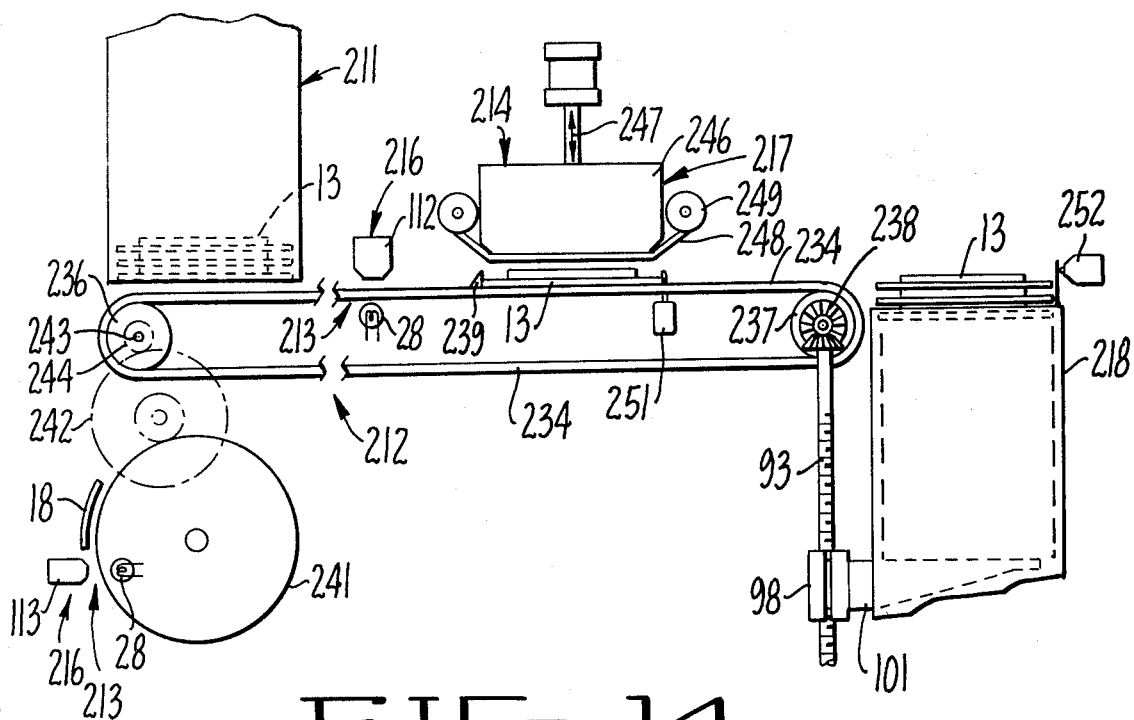
FIG. 14 is a partly schematic and partly pictorial diagram of a modified form of the device of the present invention.
Figure 15:
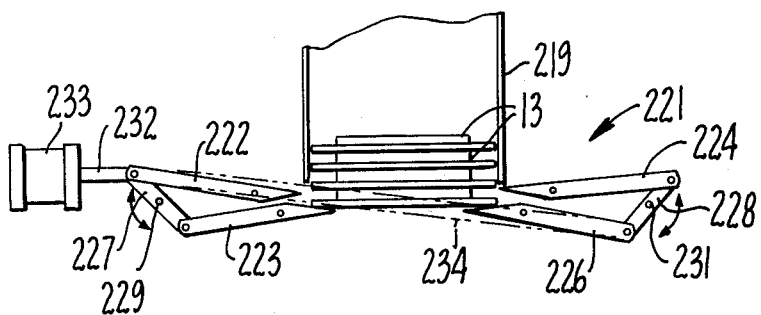
FIG. 15 is a schematic diagram of the injector mechanism of the modified form shown in FIG. 14, in the position ready to drop one individual medium.
Figure 16:
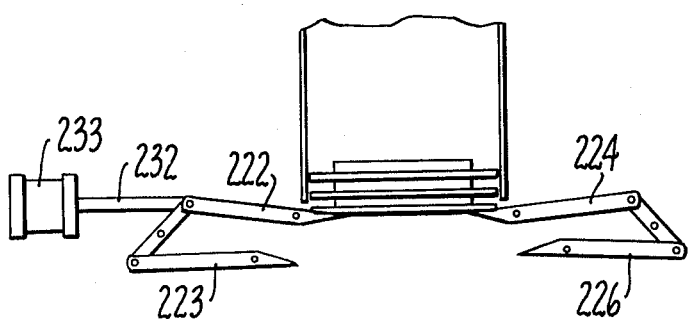
FIG. 16 is a schematic diagram of the injector mechanism of the modified form shown in FIG. 14, in the position having just dropped one individual medium.

Turning to the embodiment depicted in FIGS. 14 through 16, the device 11 as there shown includes a magazine means 211 for holding a supply of individual information-bearing media 13, a transport means generally indicated at 212 for moving individual information-bearing media 13 from the magazine means 211 through a scanning station 213 and an imprinting station generally indicated at 214. The device 11 also includes a master indicia-bearing medium 18 for specifying selectively the characteristics of the individual information-bearing media 13 to be selected for imprinting. Scanning means generally indicated at 216 are located adjacent each of the scanning stations 213, with each scanning means 216 including a plurality of sensors or detectors 24 in FIGS. 5 and 7. An imprinting means generally indicated at 217 is located adjacent the imprinting station 214 and is activated by a print signal to cause the selected information-bearing medium 13 to be imprinted against a receiving medium such as an envelope.

The scanning means 216 includes detector blocks 112 and 113 and lamps 28 akin to those shown in FIGS. 5 and 7 of the previous embodiment. The scanning means 216 also includes electronic circuitry 26 for comparing the signals received from the detector block 112 with those received from the detector block 113, such as that indicated in block diagram form at 26 in FIG. 2 and shown in detail in FIG. 19. Since the same circuitry would be appropriate for the present embodiment as that used with the embodiment of FIG. 1, it has not been shown in detail in connection with the present embodiment. As with the preceding embodiment, the electronic circuitry issues a print signal when the characteristics of the individual medium 13 and the master medium correspond. A received 218 receives the individual information-bearing medium 13 from the transport means 212 after it has passed through the scanning and imprinting stations 213 and 214.

The magazine means 211 is shown in greater detail in FIGS. 15 and 16, and includes a housing 219 adapted to enclose a stack of individual media 13 and a serial release mechanism 221 for releasing the media one at a time from the magazine 211. The serial release mechanism 221 includes two pairs of reciprocating arms 222, 223, 224 and 226, with one pair of arms located on each side of the housing 219. The arms 222 and 223 are pivotally attached to a link 227 which is in turn pivotally mounted as shown by a pin 229 to the chassis of the device 11. Similarly, arms 224 and 226 are pivotally attached to a link 228 pivotally mounted on the chassis 11 by a pin 231. The link 227 is also pivotally connected to moving member 232 of an actuator 233.

The actuator 233 may be of an appropriate type such as pneumatic or hydraulic cylinder or an electromagnetic solenoid. The links 227 and 228 are interconnected by a diagonal member 234 so that the links 227 and 228 move in opposite directions to each other when actuated by the actuator 233. When the moving member 232 of the actuator 233 is retracted, the arms 222, 223, 224 and 226 assume the position shown in FIG. 15, in which the lower arms 223 and 226 restrain the lowermost of the individual media 13 from dropping out of the housing 219. Extension of the moving member 232 causes the lower arms 223 and 226 to retract away from the housing 219, releasing the individual medium which was previously lowermost in the stack of media 13, while the upper arms 224 and 222 move inwardly into the housing 219 to restrain the next-lowermost of the individual media 13 from dropping out of the housing 219.

When the moving member 232 is again retracted into the actuator 233, the next lowermost of the individual media 13 shown restrained by the upper arms 222 and 224 in FIG. 16 will drop downward slightly and be restrained from further dropping by the lower reciprocating arms 223 and 226 as they move back inwardly into the housing 219 and the upper arms 222 and 224 retract away from the housing 219. Thus each complete in-and-out cycle of the moving member 232 will cause the release of one individual medium 13 from the stack within the housing 219. The path of motion of the arms 222, 223, 224 and 226 as they are reciprocated is controlled by appropriate guide means, such as slots in the side of the housing 219, not shown. Alternatively of course, appropriate bearing sheaths could be provided for channeling the direction of motion of the arms 222, 223, 224 and 226.

In the present embodiment the transport means 212 includes a belt 234 extending around a pair of rollers 236 and 237. One of the rollers 236 or 237 is driven by an appropriate power source (not shown) to advance the belt 234, and a bevel gear pair 238 is attached to the roller 237 for advancing the follower block 101. The bevel gear pair 238 drives a lead screw 93 essentially similar to the lead screw 93 shown in FIG. 1. A split-nut mechanism 98 essentially similar to that shown in the previous embodiment in FIG. 1 is driven in turn by the lead screw 93 to cause the follower block 101 to lower the stack of individual media 13 within the receiver 218.

A stop means schematically indicated at 239 is attached to the belt 234 to insure the accurate placement of the individual medium 13 on the belt 234. While shown schematically here, as a small abutment on the belt 234 adjacent one end of the individual medium 13, it should be appreciated that the stop means 239 might, in practice, surround a larger portion of the individual information-bearing medium 13 in a fashion similar to that shown in FIG. 12 for the embodiment of FIG. 1. The belt 234 contains an appropriate aperture (not shown) at the site at which the card 13 is carried, to permit light from the lamp 28 to pass through apertures in the card 13 and reach the detector block 112. If necessary, spring loaded idlers and friction-drag snubbers (not shown) could be employed to push the card 13 firmly against the stop means 239 to ensure precise alignment.

The transport means 212 also includes a drum 241 carrying the master indicia-bearing medium 18 along the periphery in a manner similar to that in which the master medium 18 is carried on the drum 34 of the embodiment of FIG. 1, shown in more detail in FIG. 7. In the present embodiment the drum 241 is driven in synchronism with the belt 234 through an idler 242, driven in turn by pinion 244 carried on the same shaft 243 as the roller 236. The gear reduction ratio between the shaft 243 and the drum 241 is appropriately selected so that the drum 241 will make precisely one revolution during one full circuit of travel of the belt 234. Thus the master medium 18 on the drum 241 will be moved in synchronism with the individual indicia-bearing medium 13 carried by the belt 234 as they pass the respective detector blocks 113 and 112 in the scanning means 216. An appropriate aperture (not shown) in the periphery of the drum 241 allows light to pass from the lamp 28 through the perforations in the master card 18 to the detector block 113.

The imprinting means includes a print head member 246 which may be moved up and down as suggested by the arrow 247 by an actuator, not shown, and an ink-supplying device such as a ribbon 248 carried by spools 249 attached to the printing head 246. A detector generally indicated at 251 is actuated by the presence of an individual information card 13 at the imprinting station 214 to cause the actuator (not shown) to depress the printing head 246 against a waiting receiving medium such as an envelope and the individual information-bearing medium 213, if a print signal has been given. The detector 251 has been illustrated here as if it were a microswitch device, but it should be appreciated that many forms of detector, including photo-sensitive detectors, could likewise be employed.

The actuator responsible for moving the printing head 246 could be of any suitable type, hydraulic, pneumatic or electrical, similar to the solenoid indicated in FIG. 15 at 233. Should the printing signal not be present, the triggering of the detector 251 is ineffective to cause the actuator to depress the printing head 246 against the individual information-bearing medium 13. The receiver 218 also includes a detector 252, which may, like the detector 251, be a microswitch or a photoelectric sensor, which responds successively to each new arrival of an information-bearing medium 13 into the receiver 218.

The detector 252 is responsible for cycling the operation of the device 11, causing the actuator 233 to drop a fresh information-bearing medium 13 onto the belt 234 after each time a finished individual medium 13 is received in the receiver 218. As schematically shown here, only one individual medium 13 is carried on the belt 234 at a given time, so that an appropriate delay is necessary between the triggering of the detector 252 and the operation of the actuator 233 so that the individual medium 13 will be dropped on the belt 234 just ahead of the stop means 239. Should there be more than one individual medium carried by the belt 234 at a time, through use of more than one stop means 239 and a change in the ratios in the gear train from the shaft 243 to the drum 241 to maintain synchronism, the timing of the signal from the detector 252 to cause actuation of the actuator 233 would be altered accordingly.

Figure 20:
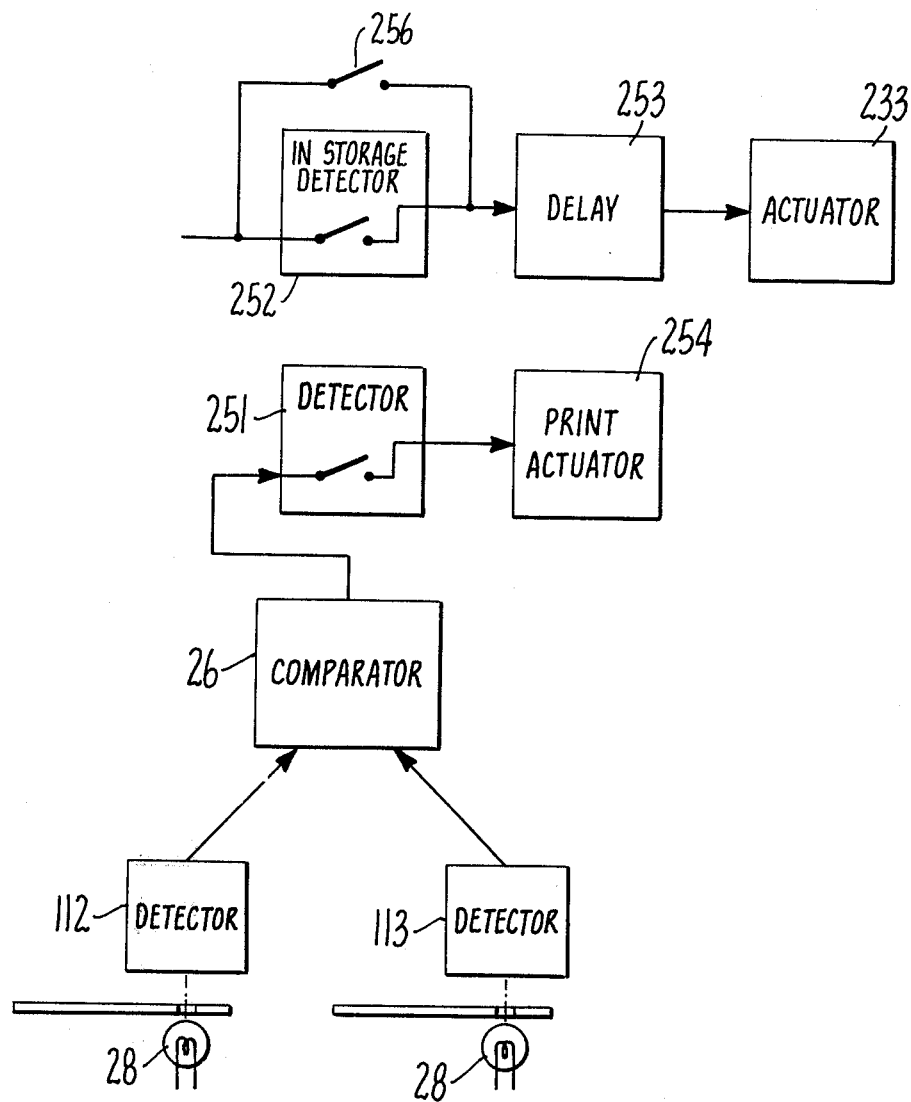
FIG. 20 is a block diagram of the circuit operation of the embodiment of the invention shown in FIG. 14.

The operation of the embodiment of FIG. 14 may be understood with reference to the block diagram of FIG. 20. For initial start-up of the machine, a starting switch graphically indicated at 256 is closed to by-pass the in-storage detector 252. At the appropriate time, when the stop means 239 is located in proper alignment with respect to the bottom of the magazine 211, the delay circuitry 253 operates the actuator 233 to cause an individual information-bearing medium 13 to be dropped onto the belt 234 in alignment with the stop means 239. The advancing of the belt 234 will pass the individual card 13 beneath the detector block 112 in synchronism with the passage of the master unit 18 beneath the detector block 113 adjacent the drum 241.

As the units 13 and 18 pass beneath their respective detector blocks, they are scanned, the signals from each compared in the electronic circuitry 26 of the comparator, and if they are properly congruent, a print signal is issued by the electronic circuitry 26. If that print signal is present, it is switched by the detector 251 upon arrival of the card beneath the printing head 246 so as to actuate the print actuator 254. The print head 246 is then driven toward the belt 234 and the individual unit 13. If the print signal from the electronic circuitry 26 is not present, triggering of the detector 251 will not pass any signal to the print actuator 254 and the printing head 246 will not move.

Whether or not the individual unit 13 is imprinted against a receiving medium by the motion of the printing head 246, it is carried continuously along by the motion of the belt 234 until it is discharged into the receiver 218. Its discharge into the receiver 218 trips the detector 252 to produce a signal which, after the appropriate time provided by the delay 253, will cause the actuator 233 to drop another individual unit 13 onto the belt 234. It should be appreciated that in place of the delay 253, an additional detector could be employed similar to the detectors 251 and 252, located to detect the arrival of the stop means 239 in position beneath the magazine means 211 ready to receive another individual unit 13.

The signal from the in-storage detector 252 on the receiver 218 is appropriately interrupted to prevent reactuation of the actuator 233 after one individual unit has been dropped onto the belt 234 and not yet carried to the receiver 218. This interruption comes as the stack of individual media 13 in the receiver 218 is lowered by the lowering of the follower block 101 to a point at which the topmost of the individual media 13 no longer triggers the detector 252. The actuator 233 may therefore retract to the position shown in FIG. 15, ready to drop another individual unit 13 upon its next actuation. An appropriate spring means may be incorporated in the actuator 233 to bring about this retraction. If desired, an additional detector may also be incorporated in the magazine means 211 to be tripped by the absence of any remaining individual unit 13 in the magazine means 211 and arranged in the circuits of the machine 11 to shut the machine down when no further individual units 13 are available in the magazine means 211.

CARD RETENTION IN THE DRUM VERSION

It will be appreciated that precise placement of the card 13 on the drum 34 with respect to the location of the master card 18 is vitally necessary. For this purpose, a stop means 39, shown in FIG. 12, aligns the card 13 on the drum 34. The stop means 39 is generally in the form of an open-sided rectangle of thin sheet material dimensioned to closely surround three edges of the card 13. Portions of the long edge of the stop means 39 may be seen in cross-section in FIGS. 5, 6 and 8.

Figure 6:
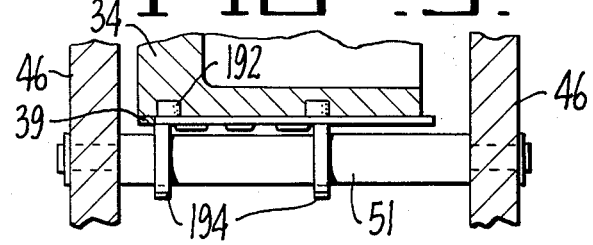
FIG. 6 is a cross-sectional view on an enlarged scale taken substantially along the plane of lines 6—6 of FIG. 3.
Figure 8:
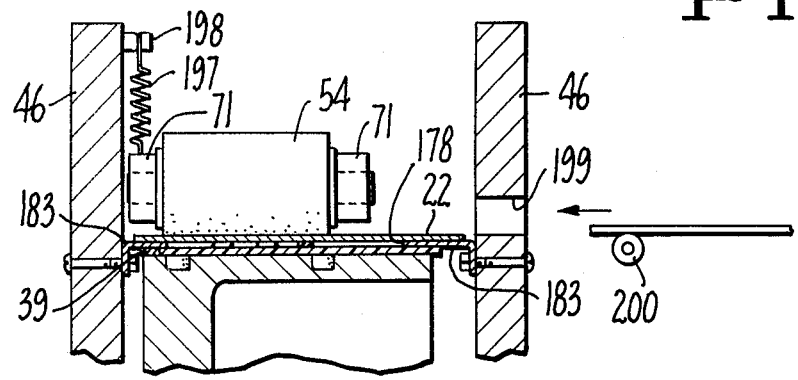
FIG. 8 is a cross-sectional view on an enlarged scale taken approximately along the plane of lines 8—8 of FIG. 3.

Sideways movement of the card 13 (parallel to the axis of the drum 34) is further restrained by friction blocks 192 set into the surface of the drum 34, as shown in FIGS. 6 and 8. The friction blocks 192 engage the underside of the card 13, and may be formed of a polymeric material having a high coefficient of friction. The master card 18 is held on the drum by insertion beneath a transparent plastic cover sheet 193 affixed to the drum 34, as shown in FIG. 7.

The guide rollers 51 include a pair of flanges 194 spaced axially apart a distance sufficient to clear the area of the card occupied by the embossing 56. The rollers 51 are journaled through the side plates 46 as shown in FIG. 6. The roller 51 associated with the detector block 112 is shorter in length to accommodate the detector 24 and its lines 111, and is journaled in the detector block 112 itself. The detector block 113 shown in FIG. 7 has a wider detector area, so the guide roller is reduced to a pair of flanges 196 rotatably journaled in the detector block 113. The flange 196 located on the right side in FIG. 7 is positioned to contact the edge portion of the individual card 13 but not the slightly narrower master card 18. The spring 197 which biases the print roller 54 upwardly may be seen in FIG. 8, extending from one of the arms 71 to a pin 198 in the sidewall 46 of the machine.

THE ENVELOPE FEED

The receiving medium or envelope 22 enters the machine through a slot 199 in the sidewall 46, as shown in FIGS. 4 and 8. An envelope-feeding device is schematically indicated by the feed roller 200 in FIG. 4, although any appropriate means of feeding envelopes one at a time into the machine 11 through the slot 199 could be used. The envelope 22 enters the machine 11 parallel to the axis of the drum 34, and is driven out of the machine generally in a direction tangential to the drum 34 as it is pinched between the print roller 54 and the individual card 13 on the drum 34 when the print roller 54 is depressed. When the print roller 54 is not depressed, the envelope 22 may idle as unselected individual cards 13 pass beneath it. An appropriate frictional snubber (not shown) may be provided, if necessary, to apply a small amount of frictional force to restrain the envelope 22 against tangential motion when the print roller 54 is not depressed.

THE CARD SORTING ATTACHMENT

Figure 17:
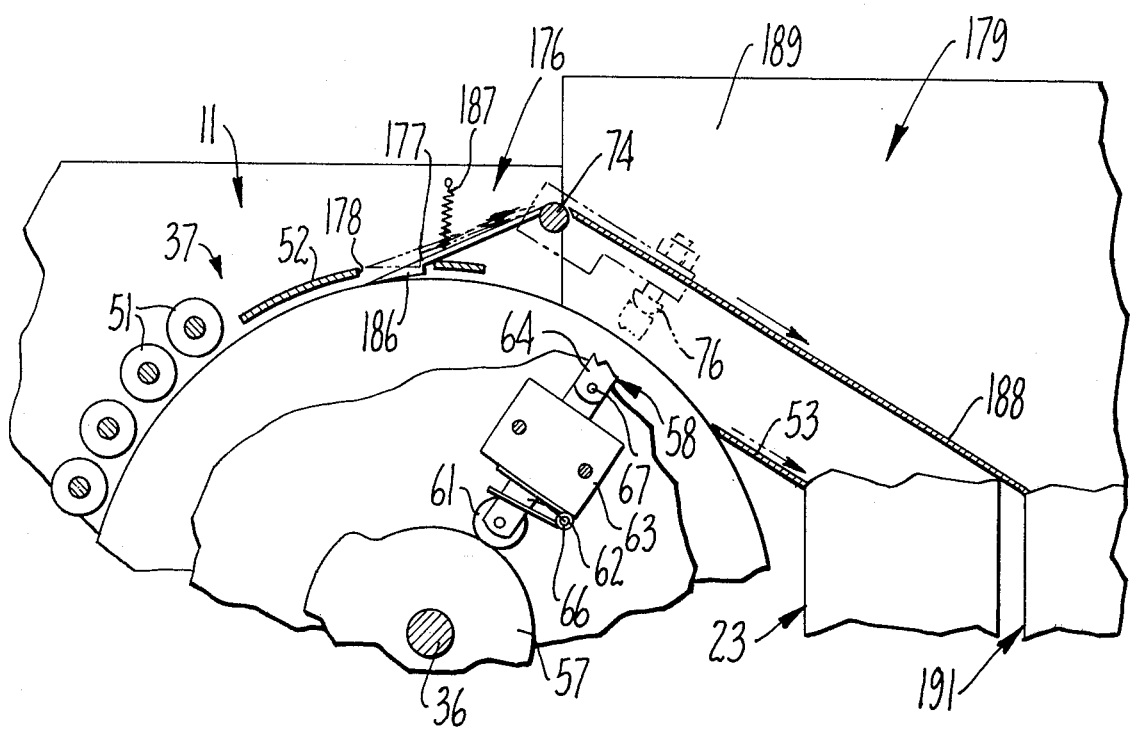
FIG. 17 is a fragmentary view with some portions broken away for clarity, corresponding in part to FIGS. 1 and 3, showing the modification of the device for sorting.
Figure 18:
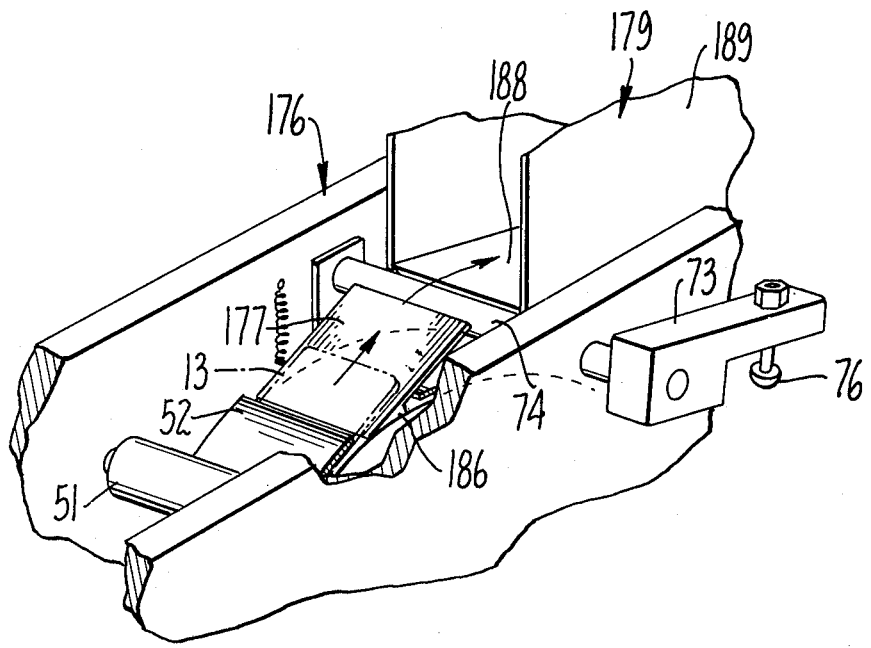
FIG. 18 is a fragmentary perspective view of the diverter portion of the modified form shown in FIG. 17.

In machines of the present type it is often useful to be able to cull certain unwanted individual media 13 out of a large batch of such cards. Such a card sorting attachment is indicated generally at 176 in FIGS. 17 and 18. It replaces the imprinting means 21 and is activated by the same cam means 57 and follower linkage 58. The arm 73 and axle 74 are the same as those used in the imprinting means 21, but in place of the arm 71 and the print roller 54, a plate member 177 is attached to the axle 74. The aperture 178 in the guide plate or shoe 52 through which the print roller 54 moved in the preceding embodiment is widened to accommodate the full width of the card 13 by removal of the side rail portions 183 of the guide plate 52. The side rail portions 183 are shown in place in FIG. 8, secured to the sidewalls 46 of the machine 11 by screws. The portion of the guide plate 52 to the left of the aperture 178 in FIG. 17 is left in place in both configurations of the machine, forcing the card 13 to conform to the circumference of the drum 34.

To replace the confining function of the side rails 183 in the present embodiment, the distal end of the plate deflector 177 may be equipped on the side confronting the drum 34 with a triangular fillet 186. The fillet 186 is operative when the deflector 177 is in its raised, non-deflecting position to cause the card 13 to pass smoothly beneath the deflector 177 and not hang up on the forward edge of the deflector or the rearward edge of the aperture 178. Alternatively, the portion of the guide plate 52 lying to the right of the aperture 178 in FIG. 17 may be removed and the fillet 186 dispensed with, leaving the unselected card 13 unconfined once it has passed the aperture 178.

When the card 13 is to remain in the main body of cards and not be sorted out, no signal is produced to the actuator 59. Like the imprinting means 21, the plate member 177 is biased away from the drum 34 by a spring 187, so that in this situation the plate member 178 is not in position to deflect the card 13 away from the drum 34. When an individual card 13 is to be removed from the group, the actuator 59 is operated to draw the pivoted link 64 into position to contact the button 76 on the arm 73 so that the cam means 57 will drive the arm 73 and the plate member 177 counterclockwise about the axle 74 at the appropriate time. As may be seen in FIG. 18, the natural springiness of the card 13 co-acts with the lowered plate member 177 to deflect the card 13 away from the drum 34 so that is passes over the plate member 177 and by its own momentum into a second receiver 179.

The second receiver 179 includes an angled slide plate 188 similar to the slide plate 53, sidewalls 189 which retain the card 13 on the plate 188, and a housing 191 into which the cards 13 fall from the slideplate 188. No follower mechanism is shown in connection with the housing 191 such as that on the first receiver 23, although it should be appreciated that the second receiver 179 could be equipped with a follower mechanism of the same type, should the proportion of cards 13 to be deflected be large compared to undiverted cards received by the first receiver 23.

The degree of movement of the plate member 177 is selected and adjusted so that when the plate member 177 is in its clockwise or raised position away from the drum 34 the cards 113 will pass beneath the plate member 177 and into the previously described first receiver 23. It should be appreciated of course that the imprinting and card sorting functions could be kept simultaneously in the same machine by providing an additional cam means similar to cam means 57, an additional follower linkage 58 and rocker mechanism 72, and an additional separately commanded actuator 59, all spaced at a slightly differing circumferential position about the drum 34, such as slightly to the clockwise of the imprinting means 21 of FIG. 3.

From the foregoing, it may be seen that a machine has been provided which makes a highly sophisticated yet rapid and reliable selection of individual cards for imprinting or sorting out. The design of the machine is one of mechanical simplicity, and no extensive memory capacity is required, yet, the selection criteria are readily changeable through use of a removable master medium.

We claim:

1. A device for selecting desired individual information-bearing media from a plurality of individual information-bearing media, comprising:

magazine means for holding a supply of individual information-bearing media, a master indicia-bearing medium for selectively specifying the characteristics of the individual information-bearing media to be selected, transport means for moving individual information-bearing media from said magazine means through scanning and selection stations, and for moving said individual information-bearing medium and said master indicia-bearing medium substantially continuously in joint synchronism with each other relative to said scanning means for simultaneous comparison of the two media thereby, scanning means adjacent said scanning station and comprising a plurality of sensors, said scanning means being responsive to the characteristics of individual information-bearing media as compared with said master indicia-bearing medium to detect those individual information-bearing media having a first predetermined correspondence of said characteristics and issue a first signal upon such detection, and to issue a second signal upon detection of a second predetermined correspondence of said characteristics and upon default of detection of either of said first and second predetermined correspondence of said characteristics, and selection means at said selection station responsive to said first and second signals to cause the desired information-bearing media to be selected out of the plurality of such media upon said first signal for further operations on such desired media, and to reject media upon said second signal.

2. A device for selecting desired media as described in claim 1 and wherein said individual information-bearing media bear a pattern of perforate and imperforate areas thereon and said master indicia-bearing medium bears a pattern of perforate and imperforate areas thereon, said patterns of perforate and imperforate areas on both said individual and said master media being simultaneously sensed by said scanning means, said scanning means further comprising a light source and a plurality of photosensitive devices positioned to sense light from said light source passing through said perforate areas, said imperforate areas serving to block transmission of light from said source to said photosensitive devices, said perforate and imperforate areas being formed in a grid of potentially perforable locations on said media, said grid on said master indicia-bearing medium having a pair of said locations thereon corresponding to each single location on said individual information-bearing medium, one of said locations of said pair corresponding to expected presence of a perforation at the corresponding location on said individual information-bearing medium and the other of said locations of said pair corresponding to the expected absence of a perforation at the same corresponding location on said individual information-bearing medium, correspondence of a perforation at said one of said locations of said pair with a corresponding perforation on the individual information-bearing medium resulting in said first signal, and correspondence of a perforation at the other of said locations of said pair with a corresponding perforation on the individual information-bearing medium resulting in said second signal, whereby the expected presence or absence of a perforation at a particular location on said individual information-bearing medium will be positively specified by the location of the perforation at the corresponding location on said master indicia-bearing medium.

3. A device for sorting information-bearing media, comprising:
magazine means for holding a supply of individual information-bearing media,
transport means for moving individual information-bearing media from said magazine means through a scanning station,
a master indicia-bearing medium for specifying the characteristics of the individual information-bearing media to be selected for sorting,
scanning means adjacent said scanning station and responsive to the characteristics of individual information-bearing media and of said master indicia-bearing medium to detect those individual information-bearing media appropriate for sorting and produce a sorting signal in response thereto,
a first receiver for receiving individual information-bearing media from said transport means,
a second receiver for receiving individual information-bearing media from said transport means, and
a diverter means interposed between said transport means and said first receiver and operative on receipt of said sorting signal from said scanning means to divert individual information-bearing media to said second receiver instead of said first receiver,
said transport means moving one of said individual information-bearing media and said master indicia-bearing medium relative to said scanning means in joint synchronism with each other for simultaneous comparison by said scanning means, the individual information-bearing media bearing a pattern of perforate and imperforate areas thereon and said master indicia-bearing medium bearing a pattern of perforate and imperforate areas thereon, said patterns on both the individual and said master media being simultaneously sensed by said scanning means,
said perforate and imperforate areas being formed in a grid of potentially perforable locations on said master indicia-bearing medium having a pair of said locations thereon corresponding to each single location on the individual information-bearing medium, one of said locations of said pair corresponding to expected presence of a perforation at the corresponding location on the individual information-bearing medium and the other of said locations of said pair corresponding to the expected absence of a perforation at the same corresponding location on the individual information-bearing medium, whereby the absence of a perforation at a particular location on the individual information-bearing medium may be positively specified by a perforation at one corresponding location on said master medium, as well as the presence of such a perforation on the individual medium being positively specified by a perforation at another corresponding location on said master medium,
said scanning means comprising a plurality of detectors for said perforations and a logical comparator circuit in communication with said detectors to receive and correlate the results from scanning one file of locations on said individual information-bearing medium with the results from scanning the corresponding two files of locations on said master indicia-bearing medium and issue a first signal upon detection of a perforation at a location along said one file on said individual medium and a perforation at the corresponding location along one of said corresponding files on said master medium and upon default of finding a perforation at said location along said one file on said individual medium with a perforation present at the corresponding location along the other of said corresponding files on said master medium, and to issue a second signal upon detection of a perforation at said location along said one file on said individual medium and a perforation at the corresponding location along the other of said corresponding files on said master medium and upon default of finding a perforation at said location along said one file on said individual medium with a perforation present at the corresponding location along said one of said corresponding files on said master medium.

4. A device for sorting as described in claim 3 and wherein said transport means comprises a drum mounted on a chassis for rotation about its axis, said drum bearing said master indicia-bearing medium and one of said individual information-bearing media thereon, rotation of said drum carrying said master and individual media past said scanning means in synchronism.

5. A device for sorting as described in claim 4 and wherein said transport means further comprises injector means synchronized with the rotation of said drum for removing individual information-bearing media one at a time from said magazine and placing said media one at a time onto said drum at a fixed location thereon.

6. A device for sorting as described in claim 4 and wherein said drum bears said master indicia-bearing medium and said one of said individual information-bearing media about its circumference curved to approximate the curvature of the circumference of said drum, said device further comprising a guide means surrounding a portion of the circumference of said drum for keeping said one of said individual information-bearing media curved to approximate the curvature of the circumference of said drum.

7. A device for sorting as described in claim 6 and wherein said first and second receivers are disposed adjacent said drum and said guide means comprises a plurality of guide rollers extending to and terminating in the vicinity of said first and second receivers, whereby said one of said individual information-bearing media is released from conformity with the circumference of said drum in the vicinity of said receivers and may exit approximately tangentially from contact with said drum toward said first and second receivers.

8. A device for sorting information-bearing media, comprising:
- magazine means for holding a supply of individual information-bearing media,
- transport means for moving individual information-bearing media from said magazine means through a scanning station,
- a master indicia-bearing medium for specifying the characteristics of the individual information-bearing media to be selected for sorting,
- scanning means adjacent said scanning station and responsive to the characteristics of individual information-bearing media and of said master indicia-bearing medium to detect those individual information-bearing media appropriate for sorting and produce a sorting signal in response thereto,
- a first receiver for receiving individual information-bearing media from said transport means,
- a second receiver for receiving individual information-bearing media from said transport means, and
- a diverter means interposed between said transport means and said first receiver and operative on receipt of said sorting signal from said scanning means to divert individual information-bearing media to said second receiver instead of said first receiver,
- said transport means moving one of said individual information-bearing media and said master indicia-bearing medium relative to said scanning means in joint synchronism with each other for simultaneous comparison by said scanning means, said transport means comprising a drum mounted on a chassis for rotation about its axis, said drum bearing said master indicia-bearing medium and one of said individual information-bearing media thereon curved to approximate the curvature of the circumference of said drum, rotation of said drum carrying said master and individual media past said scanning means in synchronism, said device further comprising a guide means surrounding a portion of the circumference of said drum for keeping said one of said individual information-bearing media curved to approximate the curvature of the circumference of said drum, said diverter means comprising a cam means means driven in synchronism with said drum, a follower linkage following said cam means, a plate member pivotally mounted on said chassis adjacent the periphery of said drum and actuated by said follower linkage for movement of the distal end of said plate member toward and away from said drum, said plate member being located and dimensioned to intersect the path of said individual information-bearing medium when the distal end thereof is moved toward the periphery of said drum, and an actuator responsive to the sorting signal from said scanning means, said follower linkage being connected to said actuator for movement thereby into and out of engagement with said plate member, said plate member when moved toward said drum causing the individual information-bearing medium to pass along the side of said plate member away from said drum, along a path leading to said second receiver and when moved away from said drum allowing the individual information-bearing medium to pass between said plate member and the periphery of said drum along a path leading to said first receiver.

* * * * *